United States Patent
Walker et al.

(10) Patent No.: US 8,354,934 B2
(45) Date of Patent: Jan. 15, 2013

(54) BURST INDICATOR

(75) Inventors: Joseph A. Walker, Kansas City, MO (US); Bon F. Shaw, Blue Springs, MO (US)

(73) Assignee: Fike Corporation, Blue Springs, MO (US)

( * ) Notice: Subject to any disclaimer, the term of this patent is extended or adjusted under 35 U.S.C. 154(b) by 425 days.

(21) Appl. No.: 12/815,252

(22) Filed: Jun. 14, 2010

(65) Prior Publication Data

US 2011/0303523 A1 Dec. 15, 2011

(51) Int. Cl.
G08B 21/00 (2006.01)

(52) U.S. Cl. .................................. 340/611; 340/626

(58) Field of Classification Search .......... 340/611, 340/626, 679
See application file for complete search history.

(56) References Cited

U.S. PATENT DOCUMENTS

| | | |
|---|---|---|
| 4,342,988 A | 8/1982 | Thompson et al. |
| 4,978,947 A | 12/1990 | Finnegan |
| 5,155,471 A | 10/1992 | Ellis et al. |
| 5,279,321 A | 1/1994 | Krimm |
| 5,313,194 A | 5/1994 | Varos |
| 5,583,490 A | 12/1996 | Santos et al. |
| 5,631,634 A | 5/1997 | Strelow |
| 5,657,001 A * | 8/1997 | Wilson .................... 340/611 |
| 5,934,308 A | 8/1999 | Farwell |
| 6,241,113 B1 | 6/2001 | Mozley et al. |
| 6,318,576 B1 | 11/2001 | Graham et al. |
| 2005/0160786 A1 | 7/2005 | Brazier et al. |
| 2005/0284649 A1 | 12/2005 | Sabates et al. |
| 2008/0289945 A1 | 11/2008 | Brazier et al. |
| 2010/0006547 A1 | 1/2010 | Shaw et al. |

FOREIGN PATENT DOCUMENTS

| | | |
|---|---|---|
| JP | 62177382 A | 8/1987 |
| JP | 0625677 U | 4/1994 |

* cited by examiner

*Primary Examiner* — Shirley Lu
(74) *Attorney, Agent, or Firm* — Hovey Williams LLP

(57) ABSTRACT

A burst indicator (24) for use in a rupture disc assembly (12) is provided. The burst indicator (24) comprises a non-electrically conductive material having an outer annular portion (66) and an inner section (68) joined to the outer portion by a pair of bridge features (70, 72). A circuit comprising electrically conductive segments (78, 80) is located on the burst indicator (24) and can be used to monitor the integrity of the rupture disc (20). One electrically conductive segment (78) is located on the outer annular portion (66), and another electrically conductive segment (80) extends across the bridge features (70, 72) and inner section (68). Upon rupture of the rupture disc (20), one of the bridge features (72) carrying an electrically conductive segment (80) severs thereby opening the circuit.

41 Claims, 5 Drawing Sheets

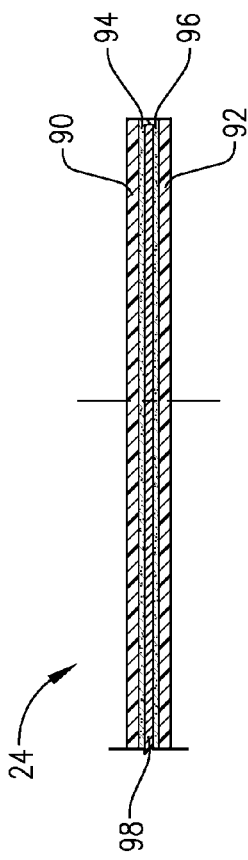
FIG. 6
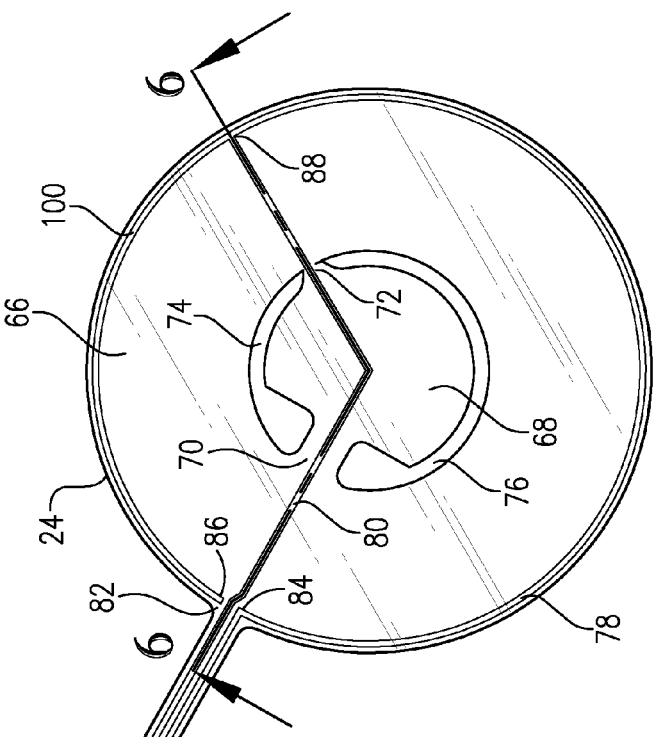
FIG. 5
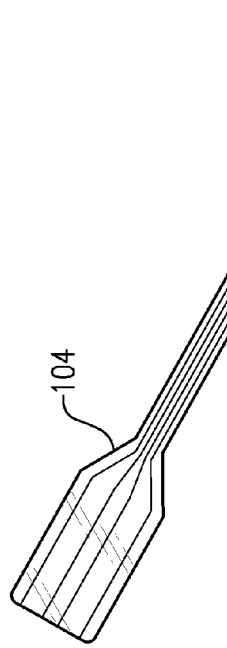
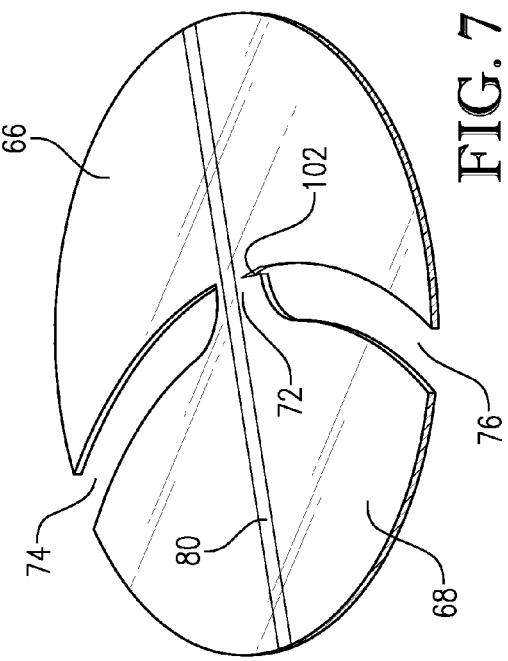
FIG. 7

BURST INDICATOR

BACKGROUND OF THE INVENTION

1. Field of the Invention

The present invention is generally directed toward a burst indicator and pressure relief devices incorporating the same. Particularly, the burst indicator comprises at least one non-electrically conductive membrane and a circuit formed from an electrically conductive material. When positioned in close proximity to a rupture disc, the burst indicator can monitor the integrity of the rupture disc and signal bursting of the disc through interruption of the electrical circuit due to severing of one or more electrically conductive segments which comprise the circuit.

2. Description of the Prior Art

In many processes and applications, rupture discs are installed in a fluid passageway, such as between two ferrules or pipe flanges in an overpressure relief apparatus. As a common example, in order to visually inspect the disc, portions of a protected apparatus or associated fluid relief passageways would need to be disassembled. In addition, rupture discs are often installed in remote or otherwise physically inaccessible locations. In such configurations, visual inspection of a rupture disc to determine its integrity can be very difficult.

Electronic monitoring systems, such as those that comprise flow sensors and burst indicators, provide for immediate notification if a disc has ruptured. U.S. Pat. No. 5,155,471 discloses a flow sensor consisting of a support gasket defining a flow way and having a thin, pliable membrane extending thereacross. An electrical conductor strip is bonded across opposing quadrants of the membrane in continuous connection to an electrical indicator circuit.

U.S. Pat. No. 4,978,947 discloses a rupturable fluid flow indicator and a rupture disc assembly including the indicator. The indicator comprises a rupturable member adapted to be clamped across a fluid flow passageway having at least one opening formed therein for weakening a portion of the member. An electric current conductor is attached across the weakened portion of the rupturable member whereby when the member ruptures as a result of fluid pressure exerted thereon, the conductor also ruptures.

U.S. Pat. No. 5,631,634 discloses a pressure sensor assembly including a disk entirely of metal and having a plurality of circumferentially spaced petals. The disk is connected to a pair of wire leads connected to an alarm monitor. Upon exposure to a rise in fluid pressure associated with the bursting of a rupture disk or valve leak, the pressure sensor tears thereby creating an open circuit.

SUMMARY OF THE INVENTION

In one embodiment according to the present invention there is provided a burst indicator comprising a non-electrically conductive material comprising an outer annular portion and an inner section joined to the outer annular portion by first and second bridge features. The burst indicator also includes an electrical circuit which comprises first and second electrically conductive segments. The first segment is located upon the outer annular portion. The second segment extends from the outer annular portion, across the first bridge feature onto the inner section, and across the second bridge feature back onto the outer annular portion where it connects with the first segment.

In another embodiment according to the present invention, there is provided a burst indicator comprising a non-electrically conductive material comprising an outer annular portion, an inner section, and at least two apertures disposed between the outer annular portion and the inner section. The apertures are separated from each other by at least first and second bridge features. The burst indicator also includes an electrical circuit which comprises at least first and second electrically conductive segments. The first segment is located on the outer annular portion. The second segment extends across the inner section and joins with the first segment at a location on the outer annular portion.

In still another embodiment according to the present invention, there is provided a rupture disc assembly comprising a rupture disc having a rupturable central section and a burst indicator for signaling rupture of the rupturable central section. The burst indicator comprises a non-electrically conductive material comprising an outer annular portion and an inner section joined to the outer annular portion by at least first and second bridge features. The burst indicator also includes an electrical circuit which comprises at least first and second electrically conductive segments. The first segment is located on the outer annular portion, and the second segment extends from the outer annular portion, across the first bridge feature onto the inner section, and across the second bridge feature onto the outer annular portion where it connects with the first segment to form a circuit.

In yet another embodiment according to the present invention, there is provided a method of monitoring the status of a rupture disc positioned within a fluid passageway. A burst indicator is provided comprising a non-electrically conductive material having an outer annular portion and an inner section joined to the outer annular portion by at least first and second bridge features. The burst indicator further includes an electrical circuit comprising at least first and second electrically conductive segments joined together to form a circuit. The first segment is located upon the outer annular portion, and the second segment extends from the outer annular portion, across the first bridge feature onto the inner section and across the second bridge feature onto the outer annular portion where it connects with the first segment. The burst indicator is positioned within said fluid passageway such that the action of a rupture disc in response to existence of a sufficient pressure condition within the fluid passageway will cause at least one of the first and second bridge features to tear, thereby severing the second electrically conductive segment and opening the circuit.

BRIEF DESCRIPTION OF THE DRAWINGS

FIG. 5 is a plan view of a burst indicator made in accordance with the present invention;

FIG. 6 is a cross-sectional view of the burst indicator taken along line 6-6 of FIG. 5; and FIG. 7 is a close up, perspective view of the severable bridge feature of the burst indicator of FIG. 5.

DETAILED DESCRIPTION OF THE PREFERRED EMBODIMENT

Figure 1:
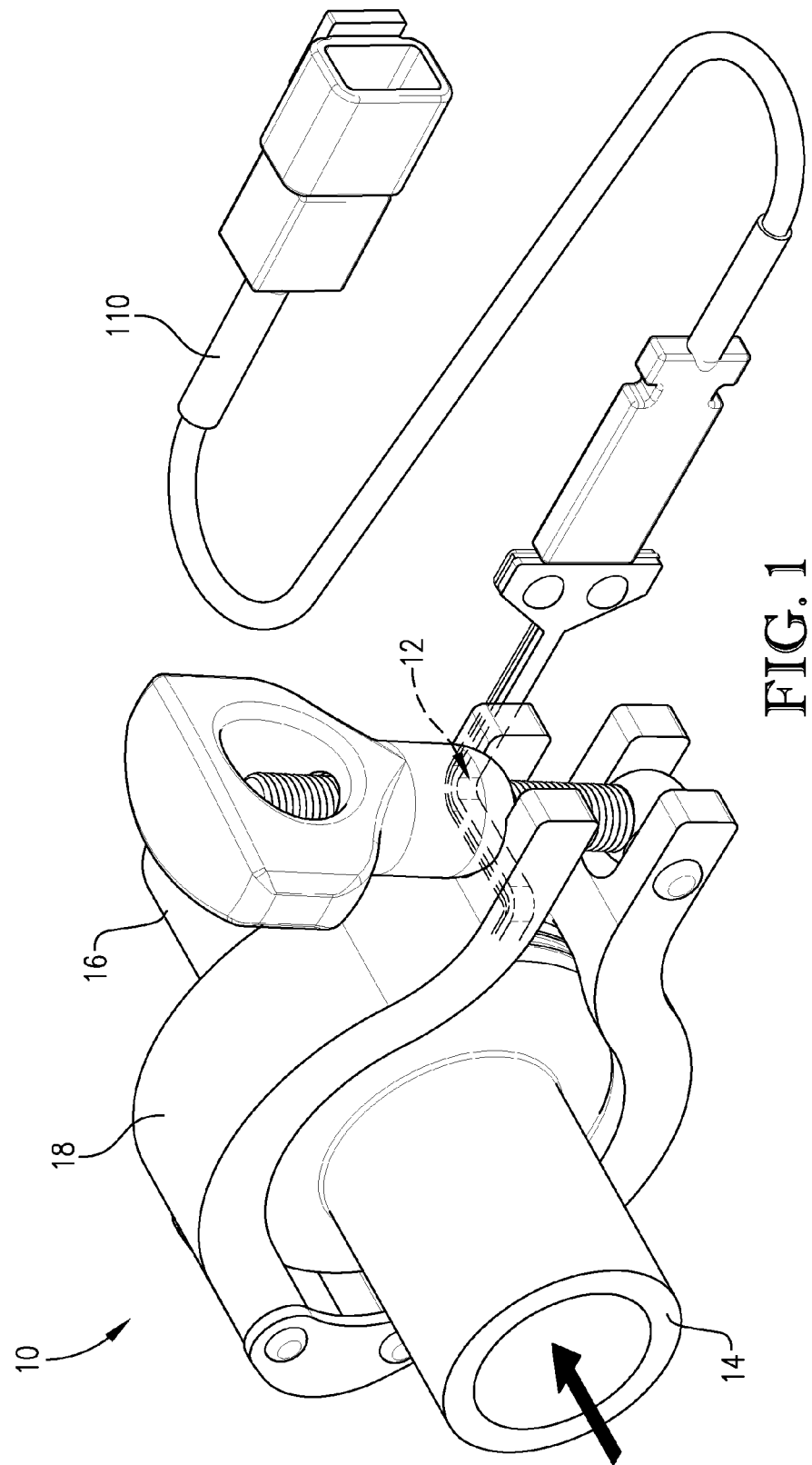
FIG. 1 is a perspective view of a pressure relief assembly including a rupture disc and a burst indicator in accordance with one embodiment of the present invention.

The following description illustrates certain embodiments of the present invention and nothing therein should be taken as a limitation upon the overall scope of the invention. Turning to FIG. 1, a pressure relief assembly 10 according to one embodiment of the present invention is shown. Assembly 10 generally comprises a rupture disc assembly 12 interposed between a pair of ferrules 14, 16. Rupture disc assembly 12 is secured between ferrules 14, 16 by a clamp 18.

When installed in pressure relief assembly 10, rupture disc assembly 12 is essentially hidden from operator view. Thus, in certain applications, it is desirable to use a sensor to monitor the integrity of the rupture disc assembly 12 and alert an operator should the rupture disc assembly fail thereby permitting communication between ferrule bores 17, 19. In certain rupture disc assembly embodiments, the sensor is positioned in close proximity to the actual rupture disc, such as between ferrules 14, 16. However, care must be taken when inserting additional structures between the ferrules as these structures could create stress zones on the rupture disc when secured between the ferrules that could affect the burst characteristics of the disc.

It was discovered that "strip-type" burst indicators such as disclosed in U.S. Pat. No. 4,342,988 affected the burst characteristics of some rupture discs to an unacceptable degree when secured along with rupture disc assembly 12 between ferrules 14, 16, even at the lower end of the burst pressure range for a particular disc of a particular thickness. It was theorized that when clamped between ferrules 14, 16, the strip-type burst indicator had the effect of creating discrete regions where the added thickness created stress zones in the outer annulus region of the rupture disc which thereby altered the burst characteristics of the disc, generally by lowering the burst pressure. This effect was predicted to be more pronounced at the upper end of the burst pressure range for a given disc thickness. As described below, burst indicators according to the present invention address this problem by providing a certain degree of uniformity in the region contacted by the ferrules.

Figure 2:
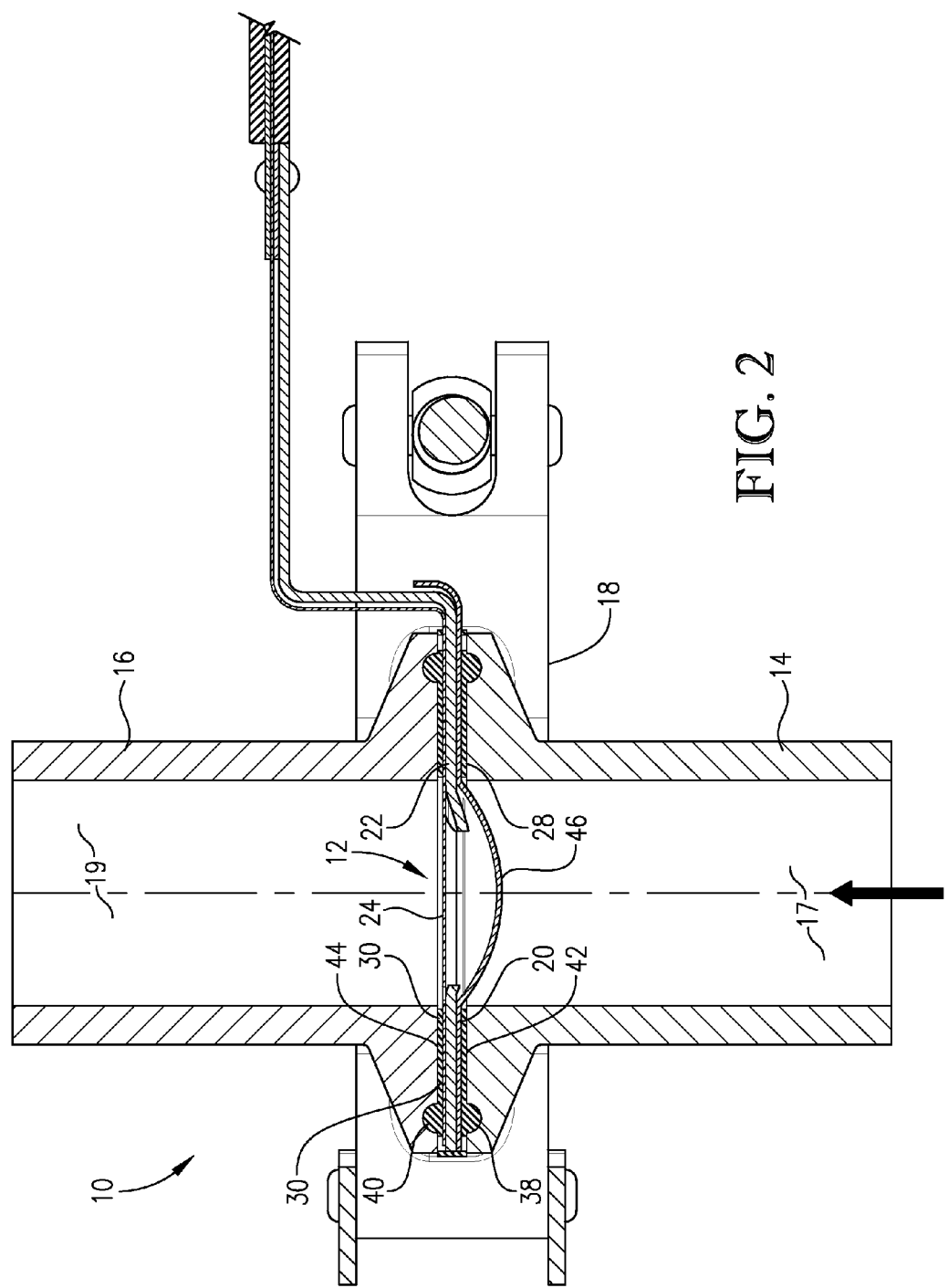
FIG. 2 is a cross-sectional view of the pressure relief assembly of FIG. 1.
Figure 3:
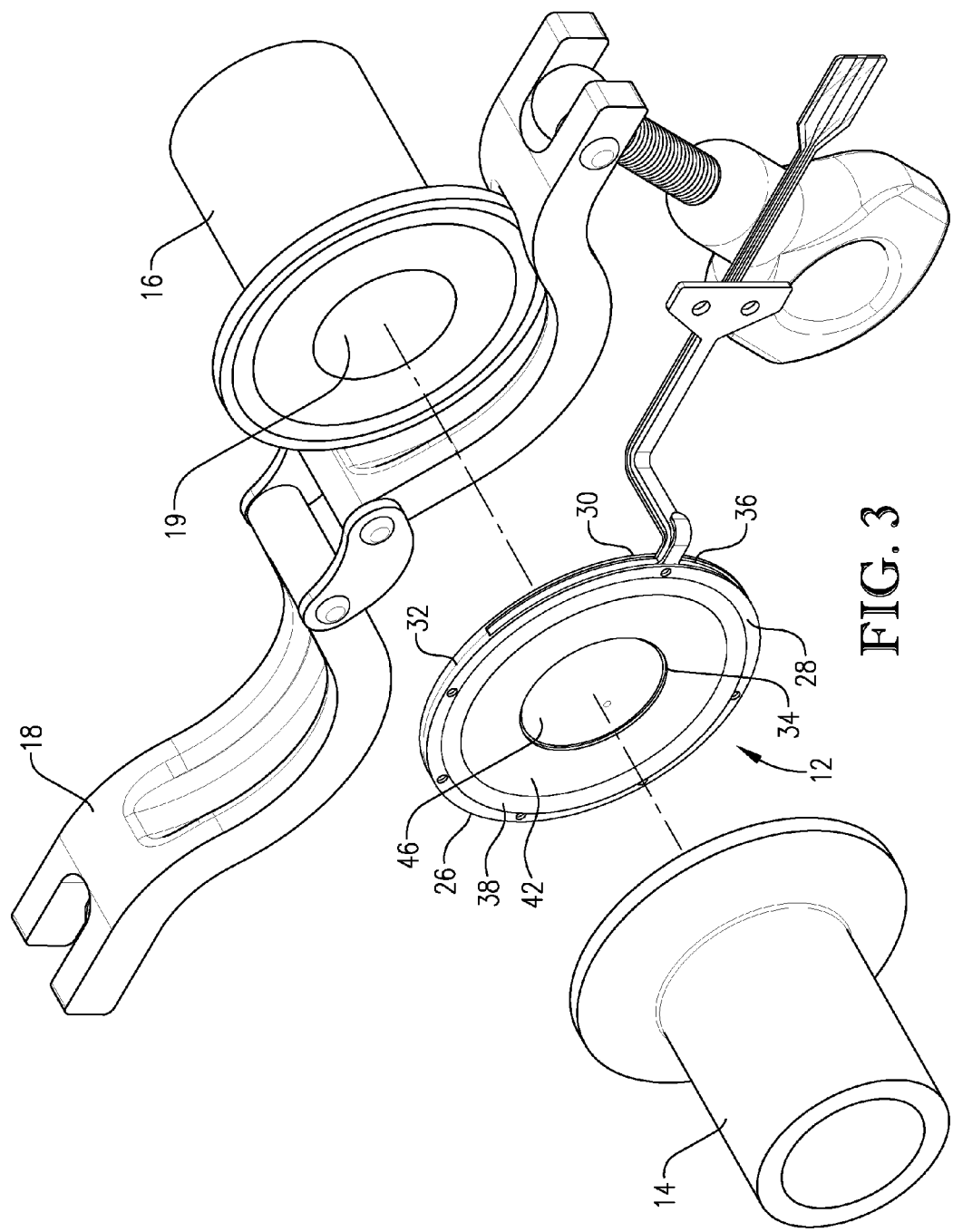
FIG. 3 is an exploded view of the pressure relief assembly of FIG. 1.
Figure 4:
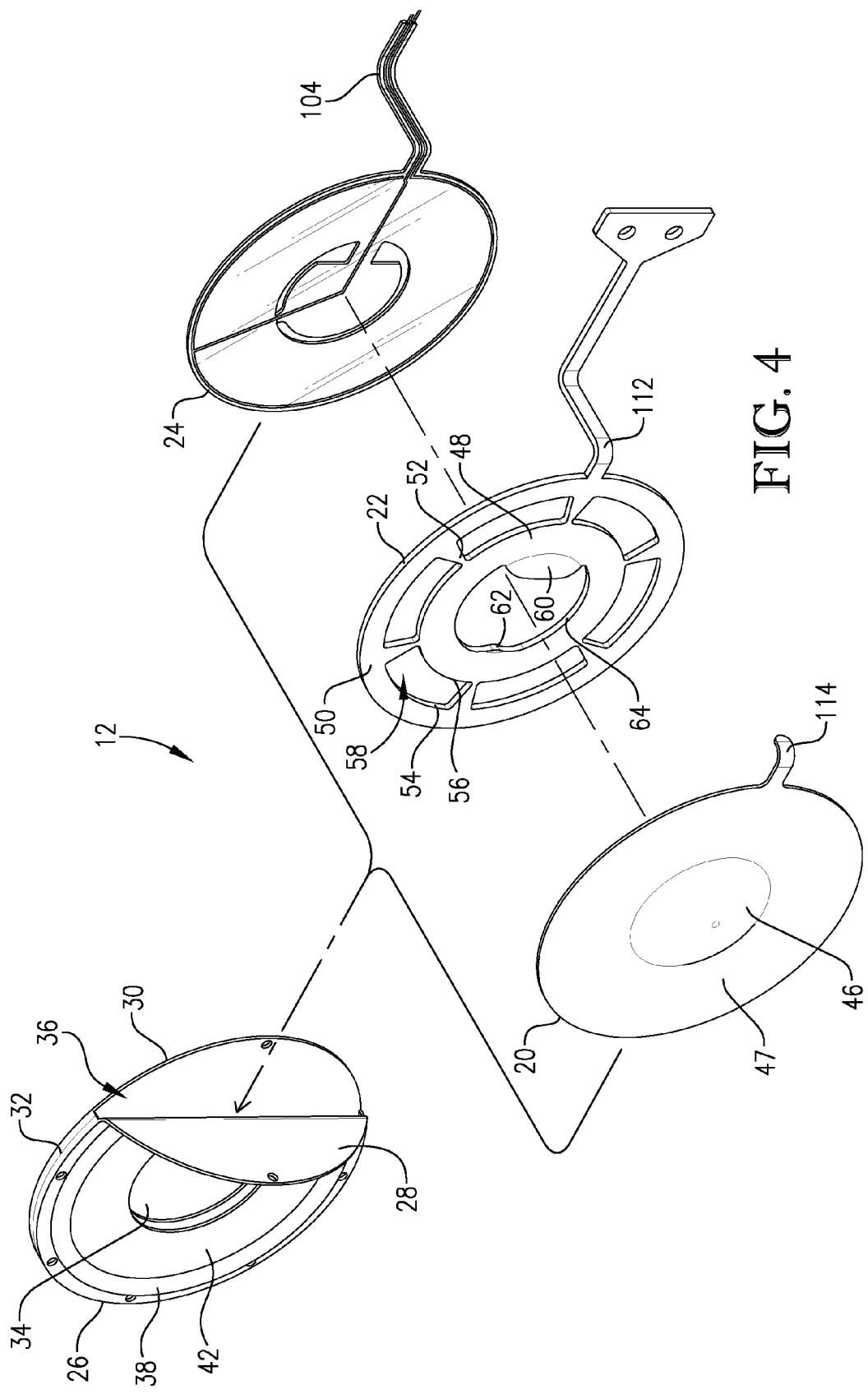
FIG. 4 is an exploded view of the rupture disc assembly including a burst indicator made in accordance with the present invention.

As shown in FIGS. 2-4, rupture disc assembly 12 comprises a rupture disc 20, a support member 22, and a burst indicator 24 that are disposed within a gasket 26. Gasket 26 comprises plies 28, 30 connected by a circumferential sidewall 32 and includes a central orifice 34. A slit 36 is formed in a portion of sidewall 32 to permit insertion of disc 20, support member 22, and burst indicator 24 in between plies 28, 30. Each ply 28, 30 of gasket 26 includes a generally circular o-ring bead 38, 40 and an inboard flange section 42, 44, respectively.

As shown, rupture disc 20 comprises a reverse-acting rupture disc having a concavo-convex (i.e., bulged or domed) central rupturable portion 46. However, it is within the scope of the present invention to employ forward-acting bulged discs and un-bulged or flat rupture discs. Exemplary rupture discs for use in accordance with the present invention are described in U.S. Pat. No. 6,945,420, incorporated herein by reference in its entirety.

As illustrated in FIG. 4, support member 22 comprises an annular inner hub 48, an outer peripheral portion 50 radially spaced from inner hub 48, and one or more connector segments 52 extending between inner hub 48 and outer peripheral portion 50. Connector segments 52, in cooperation with outer peripheral portion inner margin 54 and inner hub outer margin 56, define one or more apertures 58 in support member 22. Support member 22, and particularly inner hub 48, optionally comprises an inwardly extending tongue 60 and tooth 62. Tongue 60 extends into the support member central orifice 64 and is configured to prevent fragmentation of disc 20 during rupture. The illustrated support member is described in further detail in U.S. patent application Ser. No. 12/422,851, filed Apr. 13, 2009, which is incorporated herein by reference in its entirety. Other support members, such as relatively planar annular support rings (i.e., without apertures 58) may be used in place of support member 22.

One embodiment of a burst indicator 24 in accordance with the present invention is shown in FIG. 5. Burst indicator 24 comprises an outer annular portion 66 and an inner section 68. Annular portion 66 and inner section 68 are joined together by first and second bridge features 70, 72, respectively. Outer annular portion 66 and inner section 68 are further isolated from each other by arcuately-shaped apertures 74, 76.

Electrically conductive segments 78, 80 form a circuit that can be used to monitor the integrity of the burst indicator, and consequently the operational status of rupture disc 20. In certain embodiments, segment 78 is located entirely upon outer annular portion 66 and extends substantially around the entire circumference of portion 66, except for a very small void area 82 that is defined by first segment end regions 84, 86. In these embodiments, segment 78 does not extend across any part of inner section 68. Segment 80 extends from outer annular portion 66, and particularly through void area 82, across bridge feature 70, and onto inner section 68. At approximately the center of inner section 68, segment 80 experiences a change in direction and extends across bridge feature 72 and back onto outer annular portion 66. As shown, segment 80 changes direction by approximately 60°, although in alternate embodiments, this angle may be greater or less. In still other embodiments, segment 80 need not change direction at all and continue along a straight path through inner section 68. The orientation of bridge feature 72 is changed to accommodate the path of segment 80. Segment 80 joins with segment 78 at a junction point 88 located near the outer periphery of outer annular portion 66 to form a circuit.

Outer annular portion 66 and inner section 68 generally comprise a non-electrically conductive membrane. In one embodiment, the membrane is a laminate structure which comprises at least two layers of a synthetic resin film material, such as a polyimide film available under the trade name Kapton®. In certain embodiments, particularly as shown in FIG. 6, burst indicator 24 comprises outer synthetic resin film layers 90, 92, two intermediate layers of an adhesive 94, 96, such as an acrylic-based adhesive, and a central conductive layer 98 from which segments 78, 80 are formed. Central conductive layer 98 may comprise any suitable electrically conductive material, such as copper or silver, or as discussed in further detail below, both copper and silver. Note, it is within the scope of the present invention for burst indicator 24 to be of alternate construction, such as, for example, a single sheet of film having a conductive layer applied thereto or imprinted thereon.

Electrically conductive segment 78 comprises an arcuate segment 100 that extends from junction 88 to end region 86. Segment 100 does not form a part of the circuit, rather, it provides a certain degree of uniformity of thickness, and therefore structural loading, to the outer periphery of outer annular portion 66. If segment 100 were not present, the thickness of outer annular portion 66 in this area would be different from the thickness of outer annular portion 66 in the area of segment 78. When inserted and clamped between ferrules 14, 16, this irregularity in thicknesses could induce regions of stress in rupture disc 20 thereby altering its opening characteristics. By providing segment 100, even though it does not form a part of the circuit, the creation of these stress regions is avoided. The impact of void area 82 upon structural loading is lessened as segment 80 extends therethrough leaving only minute areas that are not occupied by electrically conductive material. In certain embodiments, segment 78 has a length that is at least about 90% of the outer circumference of outer annular portion 66. In other embodiments, this length is at least about 95% of the outer circumference of outer annular portion 66.

At least one of bridge features 70, 72 may include a weakened area that aids and/or defines an initiating point for the tearing of that bridge feature. In certain embodiments, the respective bridge feature separates from outer annular portion 66 upon rupture of the rupture disc. In alternate embodiments, the bridge feature may separate from inner section 68 while remaining attached to outer annular portion 66. In still other embodiments, the bridge feature may tear at some point in between outer annular portion 66 and inner section 68.

It was observed that the flat Kapton®, adhesive, and metallic conducting materials from which burst indicator circuits are made tear more easily when a twisting moment is applied to a bridge feature in which a starting slit has been provided, due to the enhanced concentration of stress at the tip of the slit. This twisting moment may be achieved in various ways. In one embodiment, the inclusion of an angle in segment 80 places bridge feature 72 off-center with respect to the opening central rupturable portion (petal) of a single-petal hinged rupture disc. In another embodiment, bridge features 70, 72 may or may not be co-axially aligned with each other and the entire central portion of the burst indicator 24 could be placed off center relative to the centerline or line of symmetry of central rupturable portion 46 of a single-petal hinged rupture disc 20. In yet another embodiment, the central portion of the burst indicator 24 is centered relative to the centerpoint of the rupturable portion 46, and bridge features 70, 72 are skewed at an angle relative to the line-of-symmetry of the rupture disc petal, while they may or may not be co-axially aligned with each other.

Irrespective of the configuration, in these embodiments, as the petal imparts force to the inner section 68 of the burst indicator, the desired twisting moment is imparted to bridge feature 72, and stress is concentrated at the tip of slit 102, facilitating the opening of the circuit. In one embodiment, only one weakened area for initiation of separation is included, as shown at bridge feature 72 in FIG. 7. This elimination of additional weakened areas will have the effect of concentrating stress and energy at a single point instead of two or more points, thus leading to enhanced performance during separation. As shown in FIG. 7. bridge feature 72 includes a slit 102 having an open end that communicates with aperture 76. Upon opening of rupture disc 20, central rupturable portion 46 contacts inner section 68 and places a stress on bridge features 70, 72. As can be seen in the Figures, bridge feature 72 is generally narrower than bridge feature 70 and offset therefrom. Slit 102 serves to further weaken bridge feature 72, concentrating stress at the tip of slit 102, so that it will more easily detach from outer annular portion 66 thereby severing segment 80 and opening the circuit. Upon detachment of bridge feature 72, inner section 68 is able to pivot about bridge feature 70 which acts as a hinge. Thus, because of bridge feature 70, inner section 68 does not fragment and remains attached to outer annular portion 66.

Note that slit 102, as shown in FIG. 7, is angled inwardly toward inner section 68. This slight angle optimizes tearing direction across the metallic conductive segment. The copper material, in particular, has a much higher strength and energy of rupture than the nonconductive material. Due to this difference, the path of material separation tends to change direction at the edge of the copper segment. Ideally, the path would proceed along the shortest distance across the copper, thus using the least energy to effect circuit separation. The path, as it reaches the edge of the metallic segment, tends to change direction away from the petal. Thus, the optimal path of separation before that point would be angled inward toward the petal.

In one embodiment according to the present invention, electrically conductive segment 80 may comprise primarily copper, with the exception that at least a portion of segment 80, particularly that portion which extends across bridge 72, comprises silver. Silver, especially when printed as ink, has a lower resistance to tearing than copper. Thus, using silver to form the severable portion of segment 80 can, in certain embodiments, be desirable.

As shown in FIG. 4, in one embodiment, burst indicator 24 can be assembled with support member 22 and rupture disc 20 so as to form an integrated unit that is placed within gasket 26. When placed within gasket 26, burst indicator 24 is positioned downstream from rupture disc 20 and support member 22 is located therebetween. Gasket central orifice 34 is in registry with central rupturable portion 46 and inner section 68. In certain embodiments, rupture disc 20 is a reverse-acting rupture disc having a concavo-convex rupturable portion 46. The burst indicator may be located adjacent disc 20, separated therefrom by support member 22, in facing relationship to the concave side of rupturable portion 46. It is also within the scope of the present invention for support member 22 to be eliminated from the rupture disc assembly so that outer annular portion 66 is in direct, face-to-face contact with rupture disc outer annulus portion 47. If a forward-acting, bulged disc is to be used, burst indicator 24 may need to be positioned further downstream from the rupture disc, or be configured to have a bulged shape whereby inner section 68 roughly conforms with the convex surface of the forward-acting disc but does not come into contact with it until the bulged section of the disc has ruptured. By supplying these components as an integrated assembly, installation errors, and consequently operational malfunctions, can be reduced.

Burst indicator 24, in certain embodiments, is provided with a tag 104 comprising conductive leads 106, 108 that are joined with electrically conductive segments 78, 80, respectively. Tag 104 may then be operably connected with an adapter plug 110, as shown in FIG. 1, or other similar structure so that the burst indicator circuit may be integrated with a larger monitoring system. Tag 104 also tends to be configured similarly to support member tag 112, so that the two tags can be mated for installation. As shown in FIG. 4, rupture disc 20 may also be provided with a tag 114, although, in this embodiment, tag 114 is not as long as either of tags 104 and 112. However, it is the primary function of tag 112 to assist with, ensure and visually indicate proper installation of the correct rupture disc assembly 12 within a designated pressure relief assembly 10.

It is also within the scope of the present invention for burst indicator 24 to be used in applications that do not utilize ferrules 14, 16, such as in applications where the rupture disc assembly is bolted between pipe flanges at the ends of adjacent sections of fluid conduit, or is assembled within a rupture disc holder, which is then bolted between pipe flanges at the ends of adjacent sections of fluid conduit. Although such "bolt-on" applications differ from those in which ferrules 14, 16 are present, particularly in the elimination of the softer gasket material adjacent to the disc and in the much higher clamp-up forces used on installation, the above-described advantages still apply.

The present invention also provides methods of monitoring the status of rupture disc 20 by providing a burst indicator 24 according to any embodiment described above and positioning the burst indicator in proximity to the rupture disc. Burst indicator 24 can be operably connected with a monitoring system configured to alert an operator of a change in the integrity of the rupture disc. Upon opening of rupture disc 20, as discussed above, rupturable portion 46 physically contacts inner section 68 and causes bridge feature 72 to separate from outer annular portion 66 thereby severing conductive segment 80 and opening the circuit. The opening of the circuit causes the monitoring system to alert the operator that disc 20 has burst.

We claim:

1. A burst indicator comprising:
   a non-electrically conductive material having outer annular portion and an inner section joined to said outer annular portion by at least first and second bridge features; and
   an electrical circuit comprising at least first and second electrically conductive segments, said first segment being located upon said outer annular portion, and said second segment extending from said outer annular portion, across said first bridge feature onto said inner section and across said second bridge feature onto said outer annular portion where it connects with said first segment.

2. The burst indicator according to claim 1, wherein said outer annular portion and said inner section comprise a non-electrically conductive membrane.

3. The burst indicator according to claim 2, wherein said membrane is a laminate structure comprising at least two layers of a synthetic resin film material.

4. The burst indicator according to claim 3, wherein said synthetic resin film material is a polyimide film.

5. The burst indicator according to claim 3, wherein said first and second electrically conductive segments are positioned in between said at least two layers of synthetic resin film material.

6. The burst indicator according to claim 1, wherein said first electrically conductive segment is located adjacent the outer periphery of said outer annular portion and has a length that is at least about 90% of the outer circumference of said outer annular portion.

7. The burst indicator according to claim 1, wherein said first electrically conductive segment extends circumferentially about said outer annular portion and is defined by a pair of spaced-apart end regions, said second electrically conductive segment extending between said end regions toward said first bridge feature.

8. The burst indicator according to claim 1, wherein said second bridge feature is offset from said first bridge feature.

9. The burst indicator according to claim 1, wherein said second bridge feature is configured to tear thereby resulting in severing of said second electrically conductive segment.

10. The burst indicator according to claim 9, wherein said second bridge feature includes a weakened area that assists in the tearing of said second bridge feature and severing of said second electrically conductive segment.

11. The burst indicator according to claim 10, said weakened area comprising a slit formed in said second bridge feature.

12. The burst indicator according to claim 1, said first electrically conductive segment comprising an arcuate segment that does not form a part of said circuit.

13. The burst indicator according to claim 1, said burst indicator further comprising an elongated tab on which are located leads for said first and second electrically conductive segments.

14. The burst indicator according to claim 1, wherein at least a portion of said second electrically conductive segment extending across said second bridge feature comprises silver or silver ink.

15. The burst indicator according to claim 14, wherein the remainder of said electrical circuit comprises copper.

16. The burst indicator according to claim 1, wherein at least a portion of said electrical circuit comprises copper.

17. A burst indicator comprising:
    a non-electrically conductive material comprising an outer annular portion, an inner section, and at least at least two apertures disposed between said outer annular portion and said inner section, said apertures being separated from each other by at least first and second bridge features; and
    an electrical circuit comprising at least first and second electrically conductive segments, said first segment being located on said outer annular portion, and said second segment extending across said inner section, said second segment joining with said first segment at a location on said outer annular portion.

18. The burst indicator according to claim 17, wherein said outer annular portion and said inner section comprise a non-electrically conductive membrane.

19. The burst indicator according to claim 18, wherein said membrane is a laminate structure comprising at least two layers of a synthetic resin film material.

20. The burst indicator according to claim 19, wherein said first and second electrically conductive segments are positioned in between said at least two layers of synthetic resin film material.

21. The burst indicator according to claim 17, wherein said second bridge feature is configured to tear thereby resulting in severing of said second electrically conductive segment.

22. The burst indicator according to claim 21, wherein said first bridge feature is configured to remain connected to both said outer annular portion and said inner section upon tearing of said second bridge feature.

23. The burst indicator according to claim 21, wherein said second bridge feature includes a weakened area that assists in the tearing of said second bridge feature and severing of said second electrically conductive segment.

24. The burst indicator according to claim 23, wherein said weakened area comprises a slit having an open end that communicates with one of said arcuately-shaped apertures.

25. The burst indicator according to claim 17 wherein at least a portion of said second electrically conductive segment that extends across said second bridge feature comprises silver or silver ink.

26. The burst indicator according to claim 25, wherein the remainder of said electrical circuit comprises copper.

27. The burst indicator according to claim 17, wherein at least a portion of said electrical circuit comprises copper.

28. A rupture disc assembly comprising:
    a rupture disc having a rupturable central section; and
    a burst indicator for signaling rupture of said rupturable central section comprising
      a non-electrically conductive material comprising an outer annular portion and an inner section joined to said outer annular portion by at least first and second bridge features, and
      an electrical circuit comprising at least first and second electrically conductive segments, said first segment being located on said outer annular portion, and said second segment extending from said outer annular portion, across said first bridge feature onto said inner section and across said second bridge feature onto said outer annular portion where it connects with said first segment.

29. The rupture disc assembly according to claim 28, wherein said rupture disc assembly further comprises a support member interposed between said rupture disc and said burst indicator.

30. The rupture disc assembly according to claim 29, wherein said rupture disc, support member, and burst indicator are positioned between adjacent plies of an elastomeric gasket, each ply of said elastomeric gasket having a central orifice in registry with said central rupturable section of said rupture disc.

31. The rupture disc assembly according to claim 28, wherein said outer annular portion and said inner section comprise a non-electrically conductive membrane.

32. The rupture disc assembly according to claim 31, wherein said membrane is a laminate structure comprising at least two layers of a synthetic resin film material.

33. The rupture disc assembly according to claim 32, wherein said first and second electrically conductive segments are positioned in between said at least two layers of synthetic resin film material.

34. The rupture disc assembly according to claim 28, wherein said first electrically conductive segment does not extend across said inner section.

35. The rupture disc assembly according to claim 28, wherein said first electrically conductive segment extends circumferentially about said outer annular portion and is defined by a pair of spaced-apart end regions, said second electrically conductive segment extending between said end regions toward said first bridge feature.

36. The rupture disc assembly according to claim 28, wherein said burst indicator further comprises at least at least two arcuately-shaped apertures disposed between said outer annular portion and said inner section, said arcuately-shaped apertures being separated from each other by said first and second bridge features.

37. The rupture disc assembly according to claim 28, wherein said second bridge feature is configured to tear thereby resulting in severing of said second electrically conductive segment.

38. A method of monitoring the status of a rupture disc positioned within a fluid passageway comprising:
providing a burst indicator comprising a non-electrically conductive material having an outer annular portion and an inner section joined to said outer annular portion by at least first and second bridge features, and an electrical circuit comprising at least first and second electrically conductive segments, said first segment being located upon said outer annular portion, and said second segment extending from said outer annular portion, across said first bridge feature onto said inner section and across said second bridge feature onto said outer annular portion where it connects with said first segment; and
positioning said burst indicator within said fluid passageway such that the action of said rupture disc in response to existence of a sufficient pressure condition within said fluid passageway will cause at least one of said first and second bridge features to tear, thereby severing said second electrically conductive segment and opening said circuit.

39. The method according to claim 38, wherein said burst indicator is positioned so that a rupturable portion of said rupture disc physically contacts said inner section upon opening of said rupture disc and causes at least one of said first and second bridge features to tear.

40. The method according to claim 38, wherein said rupture disc is a reverse-acting rupture disc having a concavo-convex rupturable portion, said burst indicator being located adjacent said rupture disc in facing relationship to the concave side of said rupturable portion.

41. The method according to claim 38, wherein at least one of said bridge features comprises a weakened area that assists in tearing of said at least one bridge feature.

* * * * *